(12) United States Patent
Minamisawa

(10) Patent No.: US 7,810,797 B2
(45) Date of Patent: Oct. 12, 2010

(54) FLUID FILLED VIBRATION DAMPING DEVICE AND METHOD OF PRODUCING THE SAME

(75) Inventor: Tadamitsu Minamisawa, Utsunomiya (JP)

(73) Assignee: Tokai Rubber Industries, Ltd., Komaki-shi (JP)

( * ) Notice: Subject to any disclaimer, the term of this patent is extended or adjusted under 35 U.S.C. 154(b) by 957 days.

(21) Appl. No.: 11/646,560

(22) Filed: Dec. 28, 2006

(65) Prior Publication Data

US 2007/0176339 A1 Aug. 2, 2007

(30) Foreign Application Priority Data

Jan. 31, 2006 (JP) ............................. 2006-023658
Sep. 29, 2006 (JP) ............................. 2006-267400

(51) Int. Cl.
*F16F 5/00* (2006.01)
*F16F 9/00* (2006.01)

(52) U.S. Cl. .............................. 267/140.13; 267/140.4; 267/141.4

(58) Field of Classification Search ............ 267/140.11, 267/140.12, 140.13, 140.14, 140.4, 141.1, 267/141.3, 141.4; 248/562, 636, 638
See application file for complete search history.

(56) References Cited

U.S. PATENT DOCUMENTS 5,628,498 A 5/1997 Nanno
6,349,927 B1* 2/2002 Suzuki .................. 267/140.13
6,648,312 B2* 11/2003 Kodama et al. ........ 267/140.13
2008/0230968 A1* 9/2008 Kubo et al. ............ 267/140.13
2008/0284075 A1* 11/2008 Saito et al. ............. 267/140.13
2009/0243171 A1* 10/2009 Nanno et al. ........... 267/140.13

FOREIGN PATENT DOCUMENTS

| EP | 1 241 376 A2 | 9/2002 |
|---|---|---|
| GB | 2 327 111 A | 1/1999 |
| GB | 2 391 055 A | 1/2004 |
| JP | 05-003682 U | 1/1993 |
| JP | 06-010638 U | 2/1994 |
| JP | 06-300079 A | 10/1994 |
| JP | 06-341483 A | 12/1994 |
| JP | 08-028623 A | 2/1996 |
| JP | 2003-206976 A | 7/2003 |
| JP | 2004-293580 A | 10/2004 |

* cited by examiner

*Primary Examiner*—Melody M Burch
(74) *Attorney, Agent, or Firm*—Oliff & Berridge, PLC

(57) ABSTRACT

A fluid filled vibration damping device including an elastic body connecting a first and second mounting member, a pressure-receiving chamber defined by the elastic body and an equilibrium chamber defined by a flexible rubber film. The second mounting member is press fitted into a tubular holder member having an annular holding portion integrally formed at its lower end projecting radially inwardly. A cover plate member having an outside diameter smaller than an inside diameter of the holder member is disposed within the holder member with an outer peripheral portion is fixedly clamped by the second mounting member and the annular holding portion. A sealing rubber is disposed for fluid-tightly closing a gap formed between the clamped portion so that an tightly closed air chamber defined by the cover plate member is formed on a back side of the flexible rubber film.

12 Claims, 9 Drawing Sheets

FLUID FILLED VIBRATION DAMPING DEVICE AND METHOD OF PRODUCING THE SAME

INCORPORATED BY REFERENCE

The disclosure of Japanese Patent Application No. 2006-023658 filed on Jan. 31, 2006 and No. 2006-267400 filed on Sep. 29, 2006, each including the specification, drawings and abstract is incorporated herein by reference in its entirety.

BACKGROUND OF THE INVENTION

1. Field of the Invention

The present invention relates to a fluid filled vibration damping device capable of exhibiting damping effect based on flow action of a sealed non-compressible fluid flowing through an orifice passage connecting between a pressure-receiving chamber and an equilibrium chamber, and to a method of producing the same.

2. Description of the Related Art

Fluid filled vibration damping devices capable of exhibiting vibration damping effect based on resonance or other flow action or behavior of a non-compressible fluid sealed therein are known in the art, as vibration damping devices, such as vibration damping support or vibration damping couplings, intended for installation between components that make up a vibration transmission system. JP-A-06-341483 discloses one example of the vibration damping device of this kind, wherein a first mounting member is positioned next to one opening of a second mounting member of tubular shape, and the first mounting member and second mounting member are elastically connected by a main rubber elastic body. The device is used as an automotive engine mount, for example.

In this type of fluid filled vibration damping device, the other opening of the second mounting member of tubular shape is fluid-tightly closed by a flexible rubber film, thereby forming a fluid sealing area between opposing faces of the main rubber elastic body and the flexible rubber film. Typically, the fluid sealing area is partitioned by means of a partition member supported by the second mounting member, thereby forming a pressure-receiving chamber whose wall is partially defined by the main rubber elastic body, and an equilibrium chamber whose wall is partially defined by the flexible rubber film, while an orifice passage permitting a fluid communication between the pressure-receiving chamber and the equilibrium chamber. With this arrangement, upon input of vibrational load between the first and second mounting members, relative fluid pressure fluctuation will be induced between the pressure-receiving chamber and the equilibrium chamber. In accordance with this fluid pressure fluctuation, the fluid is forced to flow through the orifice passage between the two chambers, thereby exhibiting vibration damping effect based on resonance or flow action of the fluid.

In recent years, for the purpose of enhancing vibration damping capability of the fluid filled vibration damping device of such construction, there has been proposed to provide a cover metal member for covering an external surface of the flexible rubber film, to thereby form a tightly closed air chamber on one side of the flexible rubber film opposite from the equilibrium chamber. More specifically, it has been attempt to utilize the thus formed tightly closed air chamber to control a ratio of a static spring constant and a dynamic spring constant of the vibration damping device by means of air spring action generated by the tightly closed air chamber.

The aforementioned document No. JP-A-06-341483 discloses a specific structure wherein an outer rim of the cover metal member (i.e., air-tight plate) is fixedly caulked against the second mounting member (support tube) together with an outer rim of the flexible rubber film (diaphragm).

However, the proposed assemble structure through caulking process together with the flexible rubber film, makes it difficult to conduct the assembly of the flexible rubber film within a mass of the non-compressible fluid, causing traverse effect for filling the fluid to the fluid sealing area. More specifically described, if you try to fix the flexible rubber film and the cover metal member by caulking, it is difficult to prevent entry of the fluid into the tightly closed air chamber. This drawback needs an additional special operation, e.g., for draining the fluid entered into the tightly closed air chamber via a drain port after the caulking fixation process, and closing the drain port by means of rivet or the like, as taught in JP-A-2003-206976.

To cope with this problem, the present assignee has been proposed in his prior U.S. patent application that has been issued as a U.S. Pat. No. 5,628,498, a technique wherein after the pressure-receiving chamber and the equilibrium chamber are filled with the non-compressible fluid, a metallic bracket of cup shape having a bottom is press fitted onto the fluid-filled vibration damping device, so that a bottom portion of the metallic bracket is closed by means of the flexible rubber film, thus forming the tightly closed air chamber.

However, the proposed construction of the fluid filled vibration damping device requires the metallic bracket having the bottom, providing adverse influence on the manufacturing efficiency in the coating process or the like. Namely, the metallic bracket needs to be subjected to the coating process for the purpose of rust proofing or corrosion proofing. The metallic bracket having the bottom may be coated by drenching or spraying. This is likely to cause an undesirable remain of coating on the bottom of the metallic bracket, inevitably needing cumbersome treatments for removing the coating.

Furthermore, Since the metallic bracket is not suitable for drawing process, due to its shape or strength, it may be fixed to the fluid filled vibration damping device by press fitting. However, the fixation structure by means of press fitting is likely to cause damage of the sealing rubber upon pressing, for example.

SUMMARY OF THE INVENTION

It is therefore one object of this invention to provide a fluid filled vibration damping device of novel construction by which an tightly closed air chamber is effectively formed on the back side of the flexible rubber film, without adverse influence on the step for filling a fluid to the fluid-filled area and/or a step of coating step for the bracket member or the like. It is therefore another object of the present invention to provide a novel method of manufacturing the fluid filled vibration damping device of the present invention.

The above and/or optional objects of this invention may be attained according to at least one of the following aspects of the invention. The following aspects and/or elements employed in each mode of the invention may be adopted at any possible optional combinations. It is to be understood that the principle of the invention is not limited to these aspects of the invention and combinations of the technical features, but may otherwise be recognized based on the teachings of the present invention disclosed in the entire specification and drawings or that may be recognized by those skilled in the art in the light of the present disclosure in its entirety.

A first aspect of the present invention provides a fluid filled vibration damping device comprising: a first mounting member; a second mounting member of tubular shape, disposed such that the first mounting member is located on a side of a first open end portion of the second mounting member; a main rubber elastic body elastically connecting the first mounting member and the second mounting member, and fluid-tightly sealing off the first open end portion of the second mounting member; a flexible rubber film fluid-tightly sealing off a second open end portion of the second mounting member; a partition member disposed between opposing faces of the main rubber elastic body and the flexible rubber film, and supported by the second mounting member; a pressure-receiving chamber formed on one side of the partition member with a non-compressible fluid sealed therein, the pressure-receiving chamber being partially defined by the main rubber elastic body and subjected to an input of vibration; an equilibrium chamber formed on an other side of the partition member with the non-compressible fluid sealed therein, the equilibrium chamber being partially defined by the flexible rubber film and allowed to have a variable volume; an orifice passage connecting the pressure-receiving chamber and the equilibrium chamber, and being formed by utilizing the partition member; a holder member of tubular shape into which the second mounting member is press fitted so that the second mounting member adapted to be mounted via the holder member on a target member whose vibration is requested to be damped, the holder member including an annular holding portion integrally formed at one open end thereof so as to project radially inwardly; a cover plate member having an outside diameter smaller than an inside diameter of the holder member, and disposed within the holder member with an outer peripheral portion thereof supported by the annular holding portion of the holder member, and fixedly clamped by and between the second open end portion of the second mounting member and the annular holding portion, wherein the second open end portion of the second mounting member has a tapered outer circumferential surface with a diameter gradually decreasing toward a tip end, and wherein a sealing rubber is disposed for fluid-tightly closing a gap formed between the second open end portion of the second mounting member, and the cover plate member as well as the holder member so that an tightly closed air chamber partially defined by the cover plate member is formed on a side opposite from the equilibrium chamber with the flexible rubber film interposed therebetween.

In the fluid filled vibration damping device of this construction, the tubular holder member is employed and the one open end of the holding member is closed by means of the cover plate member which is separately formed. By press fitting the second mounting member through the other open end of the holding member, the outer peripheral portion of the cover plate member is axially fixedly clamped by and between the annular holding portion formed at the one open end of the holder member and the second mounting member. Further, the sealing rubber provides a fluid-tight sealing to the fixedly clamped portion between the annular holder portion and the second mounting member.

Accordingly, after the filling of the fluid to the pressure-receiving chamber and the equilibrium chamber has completed, the body of the fluid filled vibration damping device can be assembled with the separately prepared holder member and the cover plate member in the atmosphere, making it possible to form a desired tightly closed air chamber on the backside of the flexible rubber film. With this arrangement, the formation of the tightly closed air chamber does not adversely affect on the operation for filling the non-compressible fluid to the pressure-receiving chamber and the equilibrium chamber. Also, the entry of the non-compressible fluid into the tightly closed air chamber can be readily and surely prevented, thus facilitating the formation of the tightly closed air chamber.

In addition, since the tubular member having an opening in the bottom is employed in the holder member, the device of the present invention is free from the problem of residual coating or processing liquid used in the pretreatment on the bottom of the holder member.

It is also possible to form the sealing rubber on the second open end portion of the second mounting member. However, by forming the sealing rubber on the annular holding portion of the holder member or the outer peripheral portion of the cover plate member, it is possible to prevent the damage of the sealing rubber due to the press fitting of the second mounting member to the holder member. This arrangement permits a high reliable sealing structure by means of the sealing rubber at the clamped portion of the cover plate member by the holder member and the second mounting member, and a high reliable fluid-tight sealing of the tightly closed air chamber.

Preferably, the sealing rubber is bonded by vulcanization to the outer peripheral portion of the cover plate member so as to project axially toward an inside of the holder member.

This arrangement makes it possible to handle the cover plate member and the sealing rubber integrally, and makes it possible to desirably position the sealing rubber with preciseness and stability, without needing a special operation for positioning. In the case where the sealing rubber is directional, such as upside and downside or inside and outside, the direction of assembly of the sealing rubber can be determined by the cover plate member, thereby facilitating assembly of the sealing rubber, while eliminating failure of direction upon assembling the sealing rubber. As a result, the desired fluid-tightness in the tightly closed air chamber can be obtained with enhanced ease and high stability.

More preferably, the sealing rubber has a tubular outer circumferential surface extending axially from the outer peripheral portion of the cover plate member, and a tapered inner circumferential surface with a diameter gradually decreasing from a tip end thereof to a basal end thereof, and wherein the sealing rubber is disposed while being compressed in an axial direction and an axis-perpendicular direction in the gap formed between the second open end portion of the second mounting member and the cover plate member as well as the holder member.

By employing the sealing rubber of construction as described above, the inner circumferential surface of the sealing rubber and the outer circumferential surface of the second open end portion of the second mounting member are both similarly inclined, so that the two inclined surfaces can be superposed on each other with an increased contact area. In addition, the outer circumferential surface of the sealing rubber is of the tubular shape, whereby the sealing rubber can be superposed on the inner circumferential surface of the holder member with a sufficient contact area. As a result, the axial pressing force acting on the second mounting member, the holder member, and the cover plate member can be efficiently transmitted to the sealing rubber, so that the elastic characteristics of the sealing rubber is effectively generated in the axial direction and the axis-perpendicular direction, at the cover plate member clamping position between the holder member and the second mounting member. Thus, the sealing rubber can be deformed with a relatively large force to fill the gap formed in the clamping position, further enhancing fluid-tightness in the tightly closed air chamber.

Preferably, the first open end portion of the second mounting member is bonded by vulcanization onto an outer circumferential surface of the main rubber elastic body, and an annular rubber-film fixation member is bonded by vulcanization to an outer rim of the flexible rubber film, while the second open end portion of the second mounting member is disposed onto the rubber-film fixation member and is subjected to a diameter decreasing operation so that the rubber-film fixation member is fixed to the second mounting member.

With this arrangement, the rubber-film fixation member is fitted into the second open end portion of the second mounting member which has been bonded by vulcanization onto the outer circumferential surface of the main rubber elastic body, and the second open end portion of the second mounting member is subjected to the diameter reducing operation, within the mass of the non-compressible fluid. By so doing, the pressure-receiving chamber and the equilibrium chamber can be formed and filled with the non-compressible fluid, with high efficiency of manufacture. Moreover, by executing the diameter reducing operation against the second open end portion of the second mounting member, the tapered outer circumferential surface of the second open end portion of the second mounting member, which has a diameter gradually decreasing in the axially outward direction, can be simultaneously formed, without needing another special treatment. Thus, the desired vibration damping device of fluid filled type can be manufactured with enhanced facility.

In one preferred form of the invention, the holder member includes an air vent hole perforated through a wall thereof at position located forward in a direction of press fitting of the second mounting member.

By forming the air vent hole, if the one open end of the holder member is closed by the cover plate member with a somewhat fluid-tightness, it is effectively prevented an excess air pressure increase in the tightly closed air chamber as a result of press fitting the second mounting member into the holder member. Preferably, the air vent hole is formed at the position located axially above the one open end of the holder member to which the sealing rubber is held in contact.

It should be noted that until the second mounting member reaches to its press fitting end position to generate the compression deformation of the sealing rubber to provide the fluid-tight sealing, the one open end of the holder member is not necessarily needed to be fluid-tightly closed. Accordingly, air leakage through gaps formed between the one axial end portion of the holder member and the cover plate member can be positively utilized to eliminate or minimize increase in the interior pressure of the holder member during press fitting the second mounting member into the holder member.

Preferably, the sealing rubber is bonded by vulcanization to the outer peripheral portion of the cover plate member so as to project axially toward an inside of the holder member, and the sealing rubber has an outside diameter in an initial state before being assembled, which is smaller than the inside diameter of the holder member, and once the second mounting member has been press fitted into the holder member, the sealing rubber undergoes diameter expansion deformation by means of the second open end portion of the second mounting member pressed into the holder member so that the sealing rubber is held in close contact with the inner circumferential surface of the holder member to provide a fluid-tight closure to the gap formed between the second open end portion of the second mounting member, and the cover plate member as well as the holder member.

According to this arrangement, before the second mounting member being press fitting into the holder member, a given gap is formed between the outer circumferential surface of the sealing rubber and the inner circumferential surface of the holder member. Accordingly, when the second mounting member is press fitted into the holder member, the air in the interior side of the holder member can be discharged through the gap to the external area. Further, once the second mounting member is press fitted into the holder member, the sealing rubber is compressed by the second open end portion of the second mounting member, thereby undergoing diameter expansion deformation. With this state, the gap formed between the second open end portion of the second mounting member and the cover plate member as well as the holder member is fluid-tightly closed by the deformed sealing rubber, thus assuring fluid-tight sealing in the tightly closed air chamber. Thus, this arrangement makes it possible to readily form the tightly closed air chamber capable of generating the suitable air spring property depending on the required vibration characteristics.

That is, in this preferred form of the invention, the gap formed between the outer circumferential surface of the sealing rubber in the initial or non-assembled state and the inner circumferential surface of the holder member is utilized as a air vent hole, thereby eliminating the need for forming an air vent hole to the holder member or the like. This facilitates the manufacture of the fluid filled vibration damping device, and further eliminates a possible deterioration in strength of the holder member or the like due to the perforation of the air vent hole.

In the preferred form of the present invention, a second sealing rubber is formed on a bottom surface of the outer peripheral portion of the cover plate member, and the second sealing rubber is disposed and compressed axially between the outer peripheral portion of the cover plate member and the annular holding portion of the holder member over an entire circumference.

This second sealing rubber cooperates with the sealing rubber to further enhance fluid-tight sealing at the gap formed between the second open end portion of the second mounting member and the cover plate member as well as the holder member. Before the second sealing rubber is compressed in the axial direction between the annular holding portion of the holder member and the outer peripheral portion of the cover plate member, namely, the second sealing rubber is just superposed on the annular holding portion, tiny gaps are formed between the superposed surfaces of the second sealing rubber and the annular holding member since the second sealing rubber made of a rubber material has a rugged surface. Therefore, during press fitting the second mounting member into the holder member, the air contained in an area formed between the second mounting member and the holder member can be leaked from these tiny gaps. Further, once the second mounting member is press fitted into the holder member, the second sealing rubber is compressed in the axial direction between the annular holding portion and the outer peripheral portion of the cover plate member, thus ensuring a sufficient fluid-tightness in this position. This arrangement makes it possible to further enhance the fluid-tightness in the tightly closed air chamber, while restricting increase in the interior pressure during press fitting of the second mounting member into the holder member.

Preferably, the bottom surface of the outer peripheral portion of the cover plate member and a surface of the annular holding portion of the holder member compressing the second sealing rubber are made flat extending in an axis-perpendicular direction with a given width over the entire circumference.

With this arrangement, a pressing force is effectively transmitted to the second sealing rubber between the outer peripheral portion of the cover plate member and the annular holding portion of the holder member, as the second mounting member is press fitted into the holder member in the axial direction. Thus, elastic characteristics of the second sealing rubber is effectively exhibited, thereby enhancing the fluid-tight sealing between the outer peripheral portion of the cover plate member and the annular holding portion of the holder member.

Preferably, an inner circumferential surface of the sealing rubber that comes into contact with the second open end portion of the second mounting member includes an annular protrusion extending over an entire circumference.

With this arrangement, when the sealing rubber is disposed in compression between the second open end portion of the second mounting member and the cover plate member as well as the holder member, annular protrusion undergoes elastic deformation and is held in close contact with the second open end portion of the second mounting member. Owing to the provision of the annular protrusion, the sufficient volume of sealing rubber undergoes compression deformation, thereby further enhancing the fluid-tight sealing in the tightly close air chamber. It should be noted that the annular protrusion may have a variety of shapes, as long as it provides a sufficient volume of the sealing rubber. Preferably, the annular protrusion is formed by protruding an inner circumferential surface of the sealing rubber in the radially inward by a given amount.

Preferably, a central portion of the cover plate member projects out in an axially outward direction from an axial end portion of the holder member.

The use of the cover plate member of this construction makes it possible to largely permit an amount of expansion deformation of the flexible rubber film of the tightly closed air chamber in the outward direction. Especially, the distance between the flexible rubber film and the cover plate member can be made greatest in the central portion where the amount of expansion deformation of the flexible rubber film is largest, thereby effectively preventing damages of the flexible rubber film due to interference thereof against the cover plate member.

A second aspect of the present invention provides a method of manufacturing a fluid filled vibration damping device according to the first aspect of the present invention, the method comprising the steps of: preparing a fluid filled vibration damping device body in which the first and second mounting members are connected by the main rubber elastic body with the pressure-receiving chamber and the equilibrium chamber formed therein, separately from the holder member and the cover plate member; setting the cover plate member with respect to the holder member with the outer peripheral portion of the cover plate member superposed on and supported by the annular holding portion of the holder member in position; press-fitting the second mounting member of the fluid filled vibration damping device body into the holder member so that the outer peripheral portion of the cover plate member is fixedly clamped by and between the second mounting member and the annular holding portion of the holder member, while the gap formed between the second mounting member and the holder member as well as the cover plate member is fluid tightly closed by the sealing rubber.

According to the method of the present invention, the fluid filled vibration damping device of construction according to the present invention capable of exhibiting excellent technical advantages, can be effectively produced with good operation efficiency.

Preferably, the method further comprises the steps of: preparing an integrally vulcanization molded product wherein the sealing rubber is bonded by vulcanization on the outer peripheral portion of the cover plate member so as to project axially from the cover plate member with a cylindrical outer circumferential surface; setting the integrally vulcanization molded product with respect to the holder member with a bottom surface of the outer peripheral portion of the cover plate member, which is opposite from a side on which the sealing rubber projects, superposed on and positioned to the annular holding portion of the holder member; press-fitting the second mounting member of the fluid filled vibration damping device body into the holder member so that an air in a space between the second mounting member and the holder member is discharged from the one open end of the holder member to an outside through a gap formed between an outer circumferential surface of the integrally vulcanization molded product and an inner circumferential surface of the holder member; and then subjecting the sealing rubber to diameter expansion deformation by the second open end portion of the second mounting member press fitted into the holder member so that the sealing rubber is held in close contact with the inner circumferential surface of the holder member to fluid-tightly close the gap formed between the second open end portion of the second mounting member and the cover plate member as well as the holder member.

This preferred method makes it possible to attain both of elimination of the increase in an internal pressure in the tightly closed air chamber as well as enhancement of the fluid-tight sealing of the tightly closed air chamber. Further, the sealing member is bonded by vulcanization to the outer peripheral portion of the cover plate member to provide an integrally vulcanization molded product, and the bottom surface of the outer peripheral portion of the cover plate member opposite from the side where the sealing rubber is bonded, is positioned to and supported by the annular holding member. Thus, the assembly of the sealing rubber is further facilitated, further facilitating the manufacture of the vibration damping device of the present invention.

BRIEF DESCRIPTION OF THE DRAWINGS

The foregoing and/or other objects features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
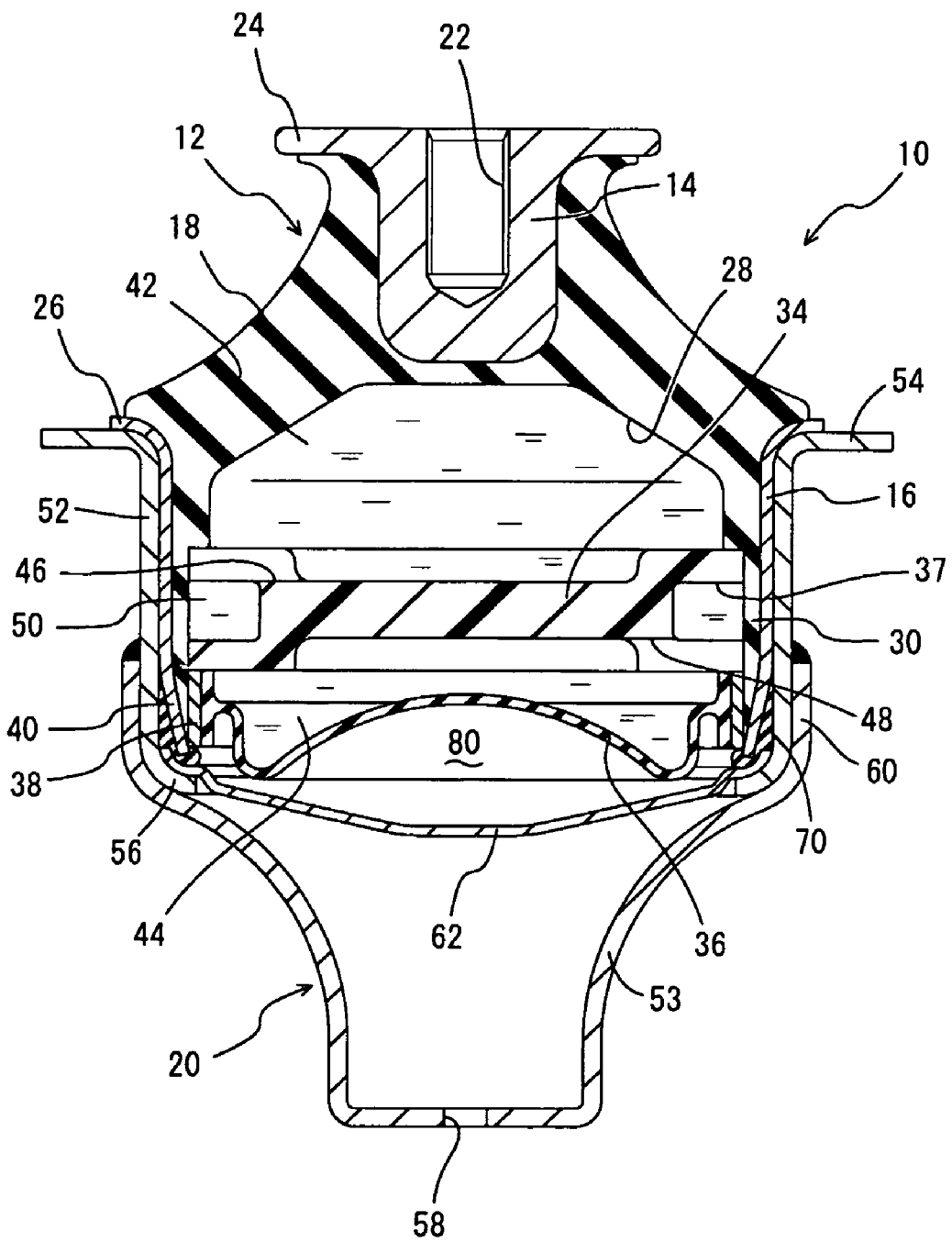
FIG. 1 is an elevational view in vertical or axial cross section of a fluid filled vibration damping device in the form of an automotive engine mount of construction according to a first embodiment of the present invention.

Referring first to FIG. 1, there is depicted an automotive engine mount 10 as a fluid filled vibration damping device pertaining to a first embodiment of the invention. This engine mount 10 is composed of a first mounting member 14 of metal and a second mounting member 16 of metal, which are elastically connected by a main rubber elastic body 18. While not shown in the drawing, the first mounting member 14 is attached to the power unit side, while the second mounting member 16 is attached to the body side of an automobile via a bracket 20 functioning as a holder member, so that the power unit is supported in vibration-damping manner on the vehicle body. In the description hereinbelow the vertical direction shall as general rule refer to the vertical direction in FIG. 1, which represents the approximately vertical direction of the installed mounting, as well as the direction of input of principal vibration load.

More specifically, the first mounting member 14 is a block shaped member extending vertically with a round tubular outer circumferential surface. The first mounting member 14 includes an annular projection 24 integrally formed at its axial upper end so as to extend radially outwardly from the outer circumferential surface, with a flange shape. The first mounting member 14 is further formed with a fixation tapped hole 22 extending along its center axis and open in its axial upper end face. The first mounting member 14 is fixed to the power unit by means of a fixation bolt (not shown) screwed into the fixation tapped hole 22.

The second mounting member 16 has a generally hollow cylindrical shape overall. The second mounting member 16 has a flange portion 26 at its axially upper open end portion which extends in an axis-perpendicular direction. On the axially upper side of the second mounting member 16, the first mounting member 14 is disposed in a coaxial fashion, with an axial spacing between the first mounting member 14 and the axially upper open end portion of the second mounting member 16. The first mounting member 14 and the second mounting member 16 is elastically connected together by means of a main rubber elastic body 18 disposed in the axial spacing between the first and second mounting members 14, 16.

Figure 2:
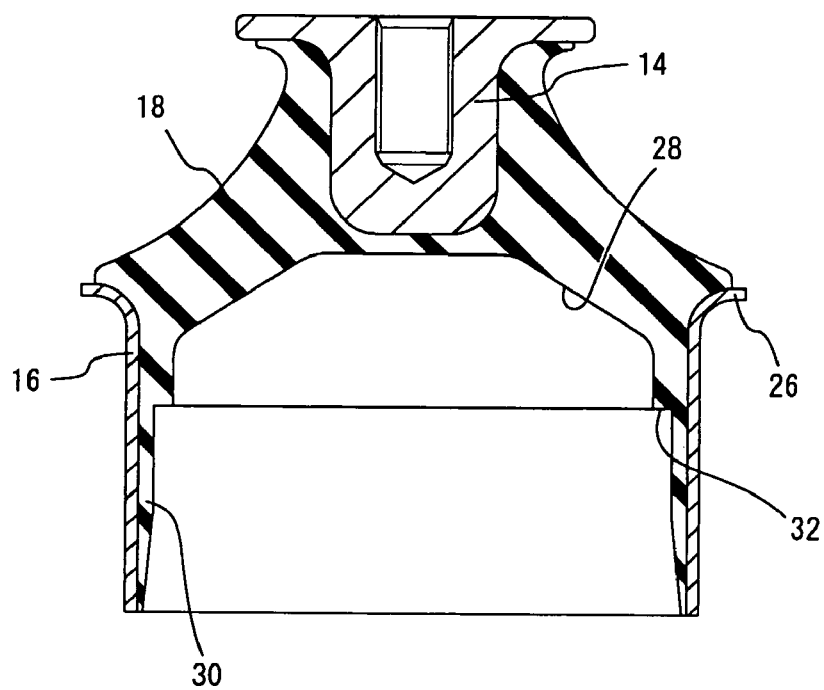
FIG. 2 is a vertical cross sectional view of an integrally vulcanization molded product of a main rubber elastic body of the engine mount of FIG. 1.

As shown in FIG. 2, the main rubber elastic body 18 has a generally frustoconical shape overall. The first mounting member 14 is bonded by vulcanization to the main rubber elastic body 18 such that the first mounting member 14 is axially inserted into the main rubber elastic body 18 from the small-diameter end face. The second mounting member 16 is bonded by vulcanization the main rubber elastic body 18 such that the axially upper open end portion of the second mounting member 16 is superposed on and bonded onto an outer circumferential surface of the large-diameter end portion of the main rubber elastic body 18. The outer peripheral portion of the main rubber elastic body 18 extends to and is bonded on the flange portion 26 of the second mounting member 16. That is, the main rubber elastic body 18 is formed as an integrally vulcanization molded product equipped with the first mounting member 14 and the second mounting member 16.

With the axially upper open end portion of the second mounting member 16 being bonded by vulcanization onto the outer circumferential surface of the main rubber elastic body 18, the axially upper open end of the second mounting member 16 is fluid-tightly closed by the main rubber elastic body 18. The main rubber elastic body 18 is provided with a large diameter recess 28 of a generally mortar shape in order to reduce or moderate stress concentration upon input of load.

A sealing rubber layer 30 is bonded onto an inner circumferential surface of the second mounting member 16. The sealing rubber layer 30 is integrally formed with the main rubber elastic body 18, so that the inner circumferential surface of the second mounting member 16 is coated by the main rubber elastic body 18 and the sealing rubber layer 30 substantially over its entire surface area.

The wall thickness of the sealing rubber layer 30 is made gradually thinner at around an axially lower open end portion of the second mounting member 16 over a given axial length, as it goes to the axially lower open end of the second mounting member 16. With this arrangement, the an inner surface of the sealing rubber layer 30 is of a tapered shape with a diameter gradually increases as it goes to the axially lower open end of the second mounting member 16. Further, the outer peripheral portion of the large diameter recess 28 and the sealing rubber layer 30 is contiguous together via an annular step portion 32 formed at an axially intermediate portion of the second mounting member 16. The annular step portion 32 extends over an entire circumference of the second mounting member 16 with a given radial width.

As shown in FIG. 1, the second mounting member 16 as one component of the aforementioned integrally vulcanization molded products, houses a partition member 34 and a diaphragm 36 functioning as a flexible rubber film, which are inserted therein in this order through the axially lower open end portion of the second mounting member 16, and are press fitted into the second mounting member 16. The partition member 34 is of a thick walled generally disk shape overall, and is formed of a rigid material such as metal or synthetic resin material. The partition member 34 is formed at its outer peripheral portion with a circumferential groove 37 open in its outer circumferential surface and extends circumferentially with a length somewhat smaller than its circumference.

Figure 3:
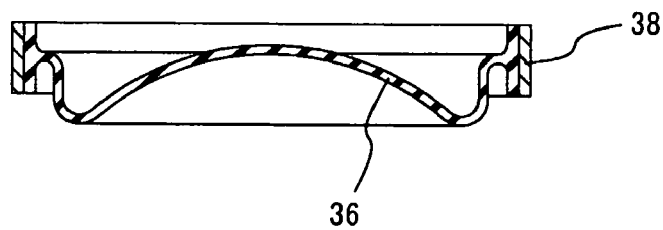
FIG. 3 is a vertical cross sectional view of an integrally vulcanization molded product of a diaphragm of the engine mount of FIG. 1.

As shown in FIG. 3, the diaphragm 36 is formed of a thin rubber film, and is of a generally thin disk shape with a waveform slack. Thus, the diaphragm 36 is ready to deform. To an outer circumferential surface of the diaphragm 36, there is bonded by vulcanization a rubber layer fixation ring 38 of annular shape, which functions as a rubber layer fixation member. With the partition member 34 and the rubber layer fixation ring 38 being axially inserted into the second mounting member 16, the second mounting member 16 is subjected to a diameter decreasing process, such as all directional drawing, whereby the partition member 34 and the rubber layer fixation ring 38 are firmly fitted into the second mounting member 16. More specifically, the diameter reducing rate in the drawing operation is made greater at the axially lower end portion of the second mounting member 16 and its adjacent portion that is fitted onto the rubber layer fixation ring 38, thus providing a tapered shape with a diameter gradually degreasing in the axially downward direction. With this arrangement, the axially lower open end portion of the second mounting member 16 is engaged with the lower end portion of the rubber layer fixation ring 38, thereby preventing dislodging of the rubber layer fixation ring 38 from the second mounting member 16. As will be understood from the above description, the axially lower part of the second mounting member 16 in the axial direction (i.e., lower part as seen in FIG. 1), provide a slant outer circumferential surface with a diameter gradually decreasing as it goes to the axial end side (i.e., lower part as seen in FIG. 1). In addition, the other axial open end, i.e., the axially lower open end of the second mounting member 16 is fluid-tightly closed by means of the diaphragm 36.

With thus assembled, the partition member 34 and the rubber layer fixation ring 38 are superposed on each other, and are axially clamped by and between the annular step portion 32 and a lower end caulking portion 40 formed on a second open end portion of the second mounting member 16, and are axially placed in position. Further, the sealing rubber layer 30 is compressed between the second mounting member 16 and both outer circumferential surfaces of the partition member 34 and the rubber layer fixation ring 38, over their entire fitting surfaces, thereby providing fluid-tight sealing.

Thus, on the axially upper side of the partition member 34, there is formed a pressure-receiving chamber 42 whose wall is partially constituted by the main rubber elastic body 18, while on the axially lower side of the partition member 34, there is formed an equilibrium chamber 44 whose wall is partially constituted by the diaphragm 36. These pressure-receiving chamber 42 and the equilibrium chamber 44 are fluid-tightly closed from the external area, and filled with a non-compressible fluid selected from water, an alkylene glycol, a polyalkylene glycol, silicone oil and the like.

Upon input of vibrational load between the first mounting member 14 and the second mounting member 16, the pressure-receiving chamber 42 generates pressure fluctuation due to the elastic deformation of the main rubber elastic body 18, while the equilibrium chamber 44 readily undergoes change in volume on the basis of readily elastic deformation of the diaphragm 36. The filling of the non-compressible fluid into the pressure-receiving chamber 42 and the equilibrium chamber 44 may be effectively executed by performing an assembly of the partition member 34 and the diaphragm 36 with respect to the second mounting member 16 as well as a drawing operation against the second mounting member 16 within the mass of the non-compressible fluid, for example.

An opening of the circumferential groove 37 formed in the outer circumferential surface of the partition member 34, is coated by the sealing rubber layer 30, and fluid-tightly covered by the second mounting member 16. Circumferentially opposite ends of the circumferential groove 37 are held in fluid communication between the pressure-receiving chamber 42 and the equilibrium chamber 44, respectively via cut-away shaped communication holes 46, 48 formed through the partition member 34. Thus, there is formed an orifice passage 50 extending circumferentially by a given length at the outer peripheral portion of the partition member 34 for mutually connecting the pressure-receiving chamber 42 and the equilibrium chamber 44.

The orifice passage 50 is tuned, for example, to a frequency effective for damping engine shakes and the like, so that flow of the fluid through the orifice passage 50 will be produced due to pressure difference between the pressure-receiving chamber 42 and the equilibrium chamber 44 generated upon input of vibration. As a result, resonance of the fluid flowing through the orifice passage 50 provides an effective vibration damping action against the target input vibration.

Thus, there is provided a fluid-filled vibration damping device body, i.e. a mount body 12 wherein the first mounting member 14 and the second mounting member 16 are elastically connected by means of the main rubber elastic body 18, and the pressure-receiving chamber 42 and the equilibrium chamber 44 are formed within the interior.

Figure 4:
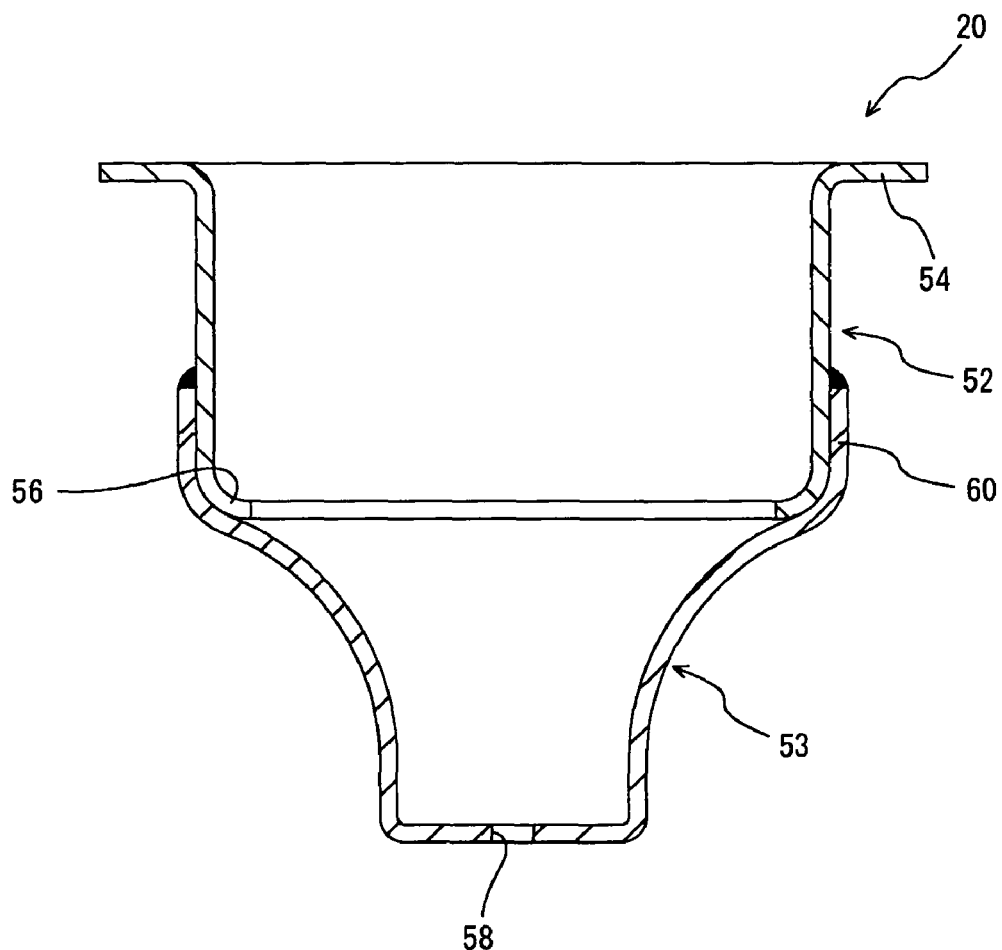
FIG. 4 is a vertical cross sectional view of a bracket of the engine mount of FIG. 1.

As shown in FIG. 1, the thus formed mount body 12 is fixedly assembled with a bracket 20 acting as a holder member. The bracket 20 is formed of a rigid material such as iron and aluminum alloy. Specifically shown in FIG. 4, the bracket 20 includes a round tubular bracket body 52 and a fixation leg 53 that is integrally fixed to the bracket body 52 by welding or the like.

The bracket body 52 has an inside diameter that is made identical with or slightly smaller than an outside diameter of the second mounting member 16 of the mount body 12. A flange portion 54 is integrally formed at an axially upper open end of the bracket body 52, so as to extend radially outwardly. At an axially lower open end of the bracket body 52, on the other hand, there is integrally formed a annular holding portion 56 projecting radially inwardly. As will be understood from FIG. 4, the annular holding portion 56 is squeezed at the portion adjacent to the axially lower open end of the bracket body 52, thereby providing an inward arcuate shape in axial cross section, which is constant over its entire circumference. In this embodiment, one open end of the holder member is formed by means of one axial open end (i.e. axially lower open end as seen in FIG. 1) of the bracket body 52 to which the annular holding portion 56 is integrally formed.

In other words, the fixation leg 53 is of a generally cup shape whose diameter is gradually increases as it goes from its axially medial portion to its axially upper portion. A bolt through hole 58 is perforated through a central portion of the bottom wall of the fixation leg 53. Further, a fixing collar portion 60 is integrally formed at an upper open end of the fixation leg 53 with a round cylindrical shape extending axially upward. The fixing collar portion 60 of the fixation leg 53 is brought into superposition onto the outer circumferential surface of the bracket body 52 from the axially lower side, and is fixed onto the bracket body 52 by welding or the like.

Namely, in the bracket 20 which is formed by integration of the bracket body 52 and the fixation leg 53, in addition to the axially upper open end of the bracket body 52, the axially lower open end of the bracket body 52 is also held in open to the external area through the bolt through hole 58 perforated through the bottom wall of the fixation leg 53. The bracket 20 is fixed to the vehicle body by means of a fixation bolt (not shown), which is inserted through a cut-away formed through an outer circumferential surface of the fixation leg 53 (not shown), and extends through the bolt through hole 58 of the fixation leg 53.

It should be noted that the fixation leg 53 is adapted to fix the bracket body 52 to the vehicle body. As long as the it acts to do so, the fixation leg 53 may have a variety of possible shapes, without being limited to the illustrated one. For instance, the fixation leg 53 may be composed of a plurality of legs fixed by welding onto the outer circumferential surface of the bracket body 52 so as to project outward.

The assembly of the mount body 12 against the bracket 20 may be executed by press-fitting the second mounting member 16 of the mount body 12 into the bracket body 52 form the axially upper side.

Figure 5:
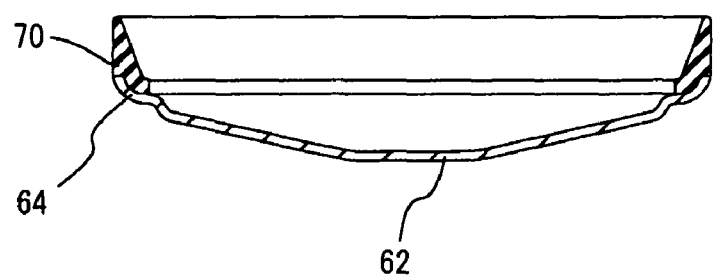
FIG. 5 is a vertical cross sectional view of an integrally vulcanization molded product of a seal rubber with a bottom wall member, which is one component of the engine mount of FIG. 1.

Before the mount body 12 is assembled with the bracket 20, there is installed in the bracket 20 a bottom wall member 62 that functions as a cover plate member. As shown in FIG. 5, the bottom wall member 62 has a generally disk shape overall, and the central portion of the bottom wall member 62 is distended downwardly, thereby providing a shallow dish shape entirety. The bottom wall member 62 is formed of a rigid material such as metal or a synthetic resin material.

A supported portion 64 is formed by bending an outer peripheral portion of the bottom wall member 62 in a slightly upward direction with a curve or an arcuate shape in cross section. The supported portion 64 has an outside diameter that is larger than an inside diameter of the annular holding portion 56 of the bracket body 52, and that is slightly smaller than an inside diameter of the bracket body 52. The supported portion 64 is inserted into the bracket body 52 from the axially upper open end of the bracket body 52, and is supported with its outer peripheral portion being superposed on an upper face of the annular holding portion 56. With this assembled state, the bottom wall member 62 is installed in position so as to extend in the axis-perpendicular direction at the axially lower open end portion of the bracket body 52, while closing the axially lower open end of the bracket body 52.

Figure 6:
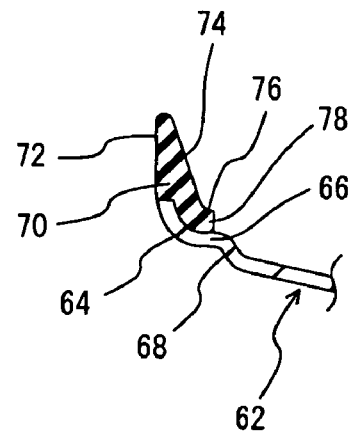
FIG. 6 is a fragmentally enlarged view of FIG. 5.

As shown in FIG. 6, an inner peripheral portion of the supported portion 64 provides an annular flat portion 66 spreads in the diametric direction, while extending over an entire circumference with a slight width-wise length. The bottom wall member 62 is further provided with an annular step portion 68 located in the radially inner side of the annular flat portion 66, and adapted to be located radially inward of an inner peripheral edge of the annular holding portion 56 of the bracket body 52. By the presence of this annular step portion 68, the central portion of the bottom wall member 62 largely projects out axially outwardly (downward in FIG. 1) beyond an axially lower end of the bracket body 52 having the annular holding portion 56.

Further, a sealing rubber 70 is bonded by vulcanization to an outer peripheral portion of the bottom wall member 62. That is, the sealing rubber 70 is formed as an integrally vulcanization molded product equipped with the bottom wall member 62. The sealing rubber 70 is of an annular shape overall, and projects upwards from an outer rim of the bottom wall member 62. In the illustrated embodiment, the sealing rubber 70 has a tapered shape in cross section wherein a thick walled dimension at its top end portion is smaller than that of its basal end portion. More specifically, an outer circumferential surface 72 of the sealing rubber 70 is a cylindrical surface extending axially upward with a constant outside diameter substantially identical with an outside diameter of the bottom wall member 62. On the other hand, an inner circumferential surface 74 of the sealing rubber 70 is an inclined inner circumferential face having a tapered shape with an inside diameter gradually decreases as its goes axially downward from a tip end portion of semi-annular cross sectional shape. Adjacent to the lower end of the inner circumferential surface 74 of the sealing rubber 70, there is formed a shoulder surface 76 extending in the radially inward direction with a given width-wise dimension. With this arrangement, a step shaped part 78 is integrally formed at the lower end portion of the sealing rubber 70, that is located on the annular flat portion 66 of the bottom wall member 62, and extends radially inwardly.

Preferably, the inside diameter of the sealing rubber 70 measured at its top end wherein it becomes greatest, is made larger than an minimum outside diameter of the lower end caulking portion 40 of the second mounting member 16 of the mount body 12. Further, the inside diameter of the sealing rubber 70 measured at its basal end (i.e. the step shaped part 78) wherein it becomes smallest, is made smaller that the smallest inside diameter of the blower end caulking portion 40 of the second mounting member 16, preferably. In the present embodiment, a boundary between the tapered portion of the inner circumferential surface 74 of the sealing rubber 70 and the shoulder surface 76 is arranged to have a diameter dimension substantially identical with a smallest inside diameter of the lower end caulking portion 40 of the second mounting member 16.

After the bottom wall member 62 is installed onto the lower open end portion of the bracket body 52, the second mounting member 16 of the mount body 12 is press-fitted into the bracket body 52 from the upper open end of the bracket body 52, thereby fixedly assembling the mount body 12 with respect to the bracket 20. With the mount body 12 and the bracket 20 thus assembled, the outer peripheral portion of the bottom wall member 62 is sandwiched by and fixed between the annular holding portion 56 of the bracket body 52 and the axially lower end portion (lower end caulking portion 40) of the second mounting member 16 in the axial direction.

Figure 7:
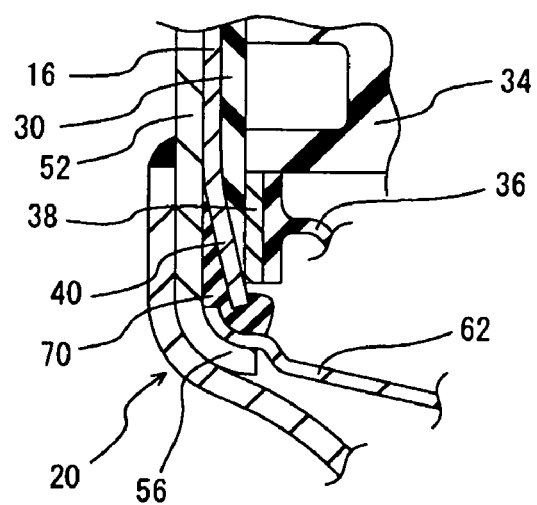
FIG. 7 is a fragmentally enlarged view of FIG. 1.

With this state, at the fixing portion of the bottom wall member 62, there is disposed in between the sealing rubber 70 in a state being compressed between the bottom wall member 62 supported by the bracket 20 and the axially lower end portion (lower end caulking portion 40) of the second mounting member 16 in the axial direction. As shown in FIG. 7, since the lower end caulking portion 40 of the second mounting member 16 provides an tapered outer circumferential surface, the sealing rubber 70 is also compressed in the axis-perpendicular direction between the lower end caulking portion 40 and the bracket body 52, while being compressed in the axial direction between the lower end caulking portion 40 and the bottom wall member 62. With this arrangement, the sealing rubber 70 fills the gaps formed between the components at the clamping and fixing portion of the outer peripheral portion of the bottom wall member 62 clamped between the annular holding portion 56 of the bracket body 52 and the axially lower end portion (lower end caulking portion 40) of the second mounting member 16, thus assuring a fluid-tight sealing structure at this position.

With this assembled state, a tightly closed air chamber 80 is formed between the diaphragm 36 of the mount body 12 and the bottom wall member 62, on the side opposite from the equilibrium chamber 44 with the diaphragm 36 interposed therebetween. By the presence of the tightly closed air chamber 80, the equilibrium chamber 44 permits a change in volume based on distending deformation of the diaphragm 36 toward the tightly closed air chamber 80, and an air spring produced by the tightly closed air chamber 80 acts on the diaphragm 36 in accordance with the distending deformation of the diaphragm 36 toward the tightly closed air chamber 80. Namely, by means of suitably adjusting air spring acting on the diaphragm 36, for example by suitably adjusting a ratio of the static spring to the dynamic spring, it is possible to adjust or tune spring characteristics of the diaphragm 36.

Next, there will be described one example of a manufacturing method of the automotive engine mount 10 of the present invention. It should be noted that the manufacturing method is not limited to the illustrated one.

Initially, the mount body 12, the bracket 20, and the integral vulcanization molded product of the sealing rubber 70 equipped with the bottom wall member 62 are respectively prepared. More specifically, the mount body 12 can be obtained by assembling an integrally vulcanization molded product of the main rubber elastic body 18 equipped with the first and second mounting members 14, 16 with the partition member 34 and the diaphragm 36 within a mass of the non-compressible fluid. Suitable advance treatments for applying a coating or a processing liquid has been performed against the bracket 20.

Subsequently, in the atmosphere, the supported portion 64 and the annular flat portion 66 of the bottom wall member 62 on the side opposite from the sealing rubber 70 is superposed on the annular holding portion 56 of the bracket body 52 in the axial direction, and the central portion and the annular step portion 68 of the bottom wall member 62 is positioned in the radially inward of the annular holding portion 56 so that the central portion of the bottom wall member 62 project out from the lower open end at the annular holding portion 56 of the bracket body 52 in the axially outward direction (downward in FIG. 1). With the above-described state, the bottom wall member 62 is supported by the bracket 20 in position.

Then, from the axially upper open end of the bracket body 52, the mount body 12 is press fitted into the bracket body 52 in the axial direction, until the flange portion 26 of the second mounting member 16 comes into abutment with the flange portion 54 of the bracket body 52.

With this state, the inclined inner circumferential surface 74 of the sealing rubber 70 and the inclined outer circumferential surface of the lower end caulking portion 40 are held in close contact with each other, while the tip end portion (face) of the lower end caulking portion 40 presses against the shoulder surface 76 of the sealing rubber 70. Thus, the sealing rubber 70 undergoes compression deformation between the lower end caulking portion 40 and the supported portion 64 as well as the annular flat portion 66 of the bottom wall member 62 in the axial direction. On the basis of the compression deformation of the sealing rubber 70 in the axial direction, the sealing rubber 70 undergoes distension deformation in the axial direction, whereby the outer circumferential surface 72 of the sealing rubber 70 is held in close contact against the inner circumferential surface of the bracket body 52.

Namely, by press fitting the mount body 12 into the bracket 20, the outer peripheral portion of the bottom wall member 62 is forcedly clamped and fixed between the second mounting member 16 and the annular holding portion 56 of the bracket 20, and simultaneously, the gaps formed between the second mounting member 16, the bracket 20, and the bottom wall member 62 are fluid-tightly sealed by means of the sealing rubber 70. As a result of this arrangement, the tightly closed air chamber 80 closed by means of the bottom wall member 62 is formed on the side opposite from the equilibrium chamber 44 with the diaphragm 36 interposed therebetween.

In the automotive engine mount 10 of construction as discussed above, the mount body 12 is previously formed by filling the non-compressible fluid into the pressure-receiving chamber 42 and the equilibrium chamber 44, and then the thus prepared mount body 12 is assembled with the bracket 20 in the atmosphere. At this time, the tightly closed air chamber 80 can be formed. This arrangement makes it possible to readily fill the non-compressible fluid within the pressure-receiving chamber 42 and the equilibrium chamber 44, while perfectly preventing entry of the non-compressible fluid into the tightly closed air chamber 80. Thus, it is possible to readily manufacture the desired engine mount 10.

According to the engine mount 10 of the present embodiment, the axially lower open end of the tubular bracket body 52 is fluid-tightly closed by means of the bottom wall member 62, thus eliminating the need for making the bottom of the bracket body 52 in a closed structure. This prevents undesirable remains at the bottom of the bracket 20 of the coating or treatment liquid used in the advance treatment of the bracket 20, thus making it possible to execute a coating process or the like of the bracket 20 with excellent operation efficiency.

In the present embodiment, since the sealing rubber 70 is bonded by vulcanization to the bottom wall member 62, thereby avoiding cumbersome in handing the increased number of components. Further, the sealing rubber 70 can be set in the desired position with a high positioning precision, thereby obtaining a high sealing capability and a fluid-tightness of the tightly closed air chamber 80 with high reliability.

Figure 8:
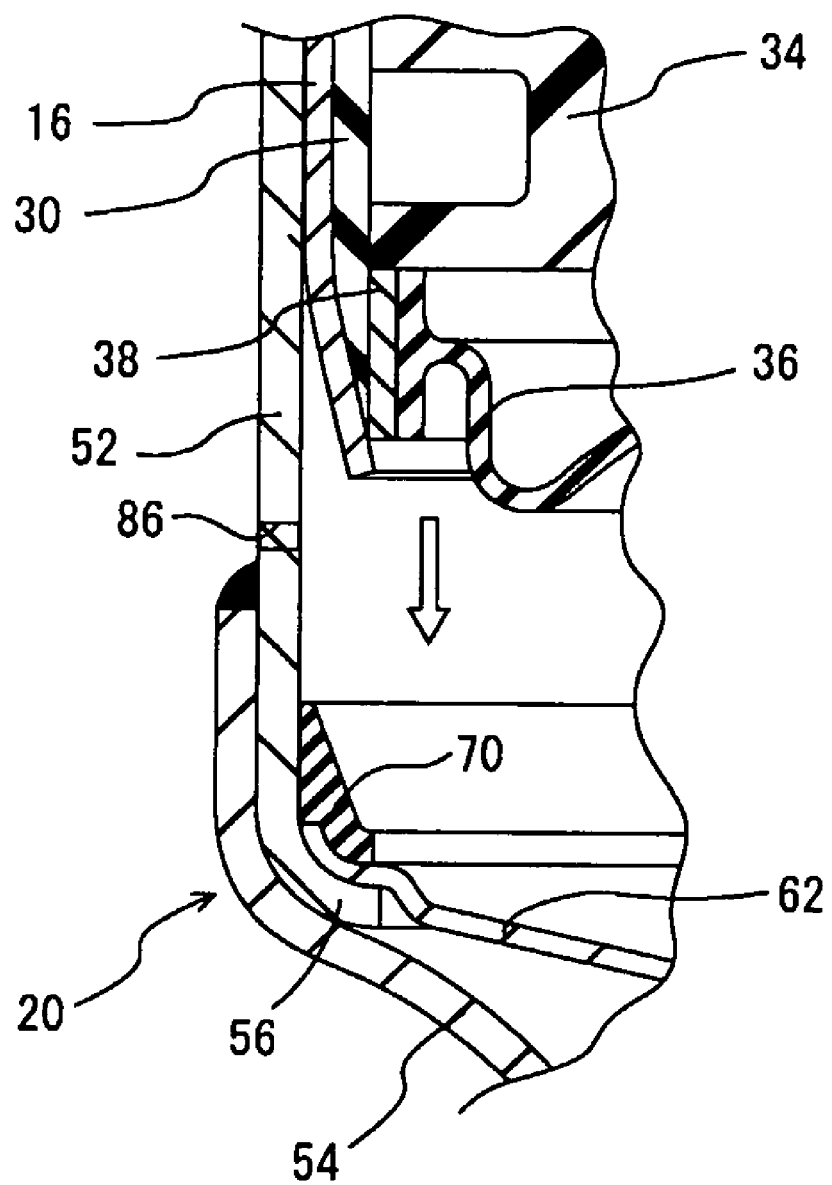
FIG. 8 is an enlarged cross sectional view for explaining one manufacturing step of an automotive engine mount of construction according to a second embodiment of the present invention.

Referring next to FIG. 8, there is shown one manufacturing process of an automotive engine mount of construction according to a second embodiment of the present invention. In the following description, the same reference numerals as used in the first embodiment are used for identifying structurally and functionally corresponding elements, and eliminate redundant explanation for these elements.

More specifically, in the present embodiment, the cylindrical wall portion of the bracket body 52 is formed with an air vent hole 86 perforated therethrough. The air vent hole 86 can be provided in a variety of shape, size, numbers, positions or the like, without specific limitation, depending on the required air vent amount, or manufacturing efficiency. In the present embodiment, for example, at least one air vent hole 86 in the form of a small diameter circular hole is provided at a location positioned axially above the sealing rubber 70 in the state where the outer peripheral portion of the bottom wall member 62 is superposed on the annular holding portion 56 of the bracket body 52, namely at a location positioned axially center side in comparison with the one open end portion of the bracket body 52 against which the sealing rubber 70 comes into close contact (in other words, the top end of the second mounting member 16 in the press-fitting direction).

With this arrangement, upon press-fitting the mount body 12 into the bracket body 52, an excess air present between the bottom wall member 62 and the mount body 12 in the bracket body 52, can be vented through the air vent hole 86. Since the air vent hole 86 is located above the sealing area by means of the sealing rubber 70 in the axial direction of the bracket body 52, the formation of the air vent hole 86 does not provide adverse influence against the fluid tightness in the tightly closed air chamber 80.

The provision of such an air vent hole 86 makes it possible to avoid unnecessary pressure increase in the tightly closed air chamber 80. Accordingly, an air spring action based on the air pressure in the tightly closed air chamber 80 can be stably executed, making it possible to stabilize spring characteristics of the tightly closed air chamber 80.

It should be appreciated that the automotive engine mount 10 of construction according to the present invention may be established with no air vent hole 86 as discussed above. For instance, it may be applicable in the present invention to set an interior pressure in the tightly closed air chamber 80 to a level greater than the atmosphere by employing a specific structure of the sealing rubber 70 that makes it possible to prevent as much as possible a leak of excess air upon press fitting the mount body 12 against the bracket body 52. Such a tightly closed air chamber 80 of positive pressure type may be effective to adjust a ratio of static spring to dynamic spring in the engine mount 10, for example.

Conversely, instead of or in addition to the air vent hole 86, the sealing rubber 70 may be formed in an initial configuration so that a gap is formed between the sealing rubber 70 and the inner circumferential surface of the bracket body 52. This gap is maintained until the sealing rubber 70 is brought into a pressing contact, thereby permitting a leak of the air from the gap between the bracket body 52 and the bottom wall member 62. This arrangement is able to obtain the same advantages as the air vent hole 86.

Figure 9:
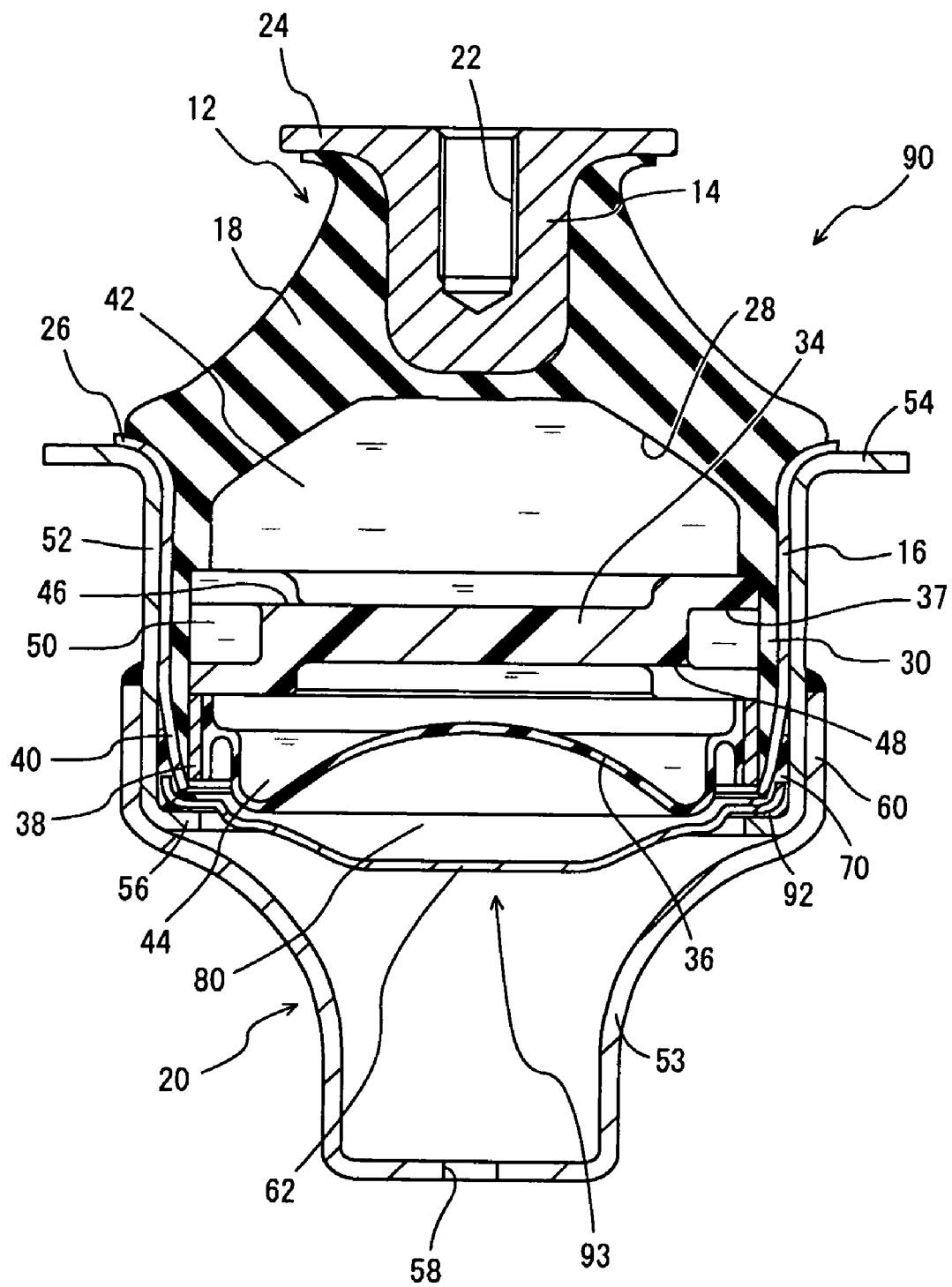
FIG. 9 is an elevational view in vertical or axial cross section of a fluid filled vibration damping device in the form of an automotive engine mount of construction according to a third embodiment of the present invention.

Referring next to FIG. 9, there is shown a fluid filled vibration damping device in the form of an automotive engine mount 90 of construction according to a third embodiment of the present invention. This automotive engine mount 90 has unique characteristics in the sealing construction of the tightly closed air chamber 80.

Figure 10:
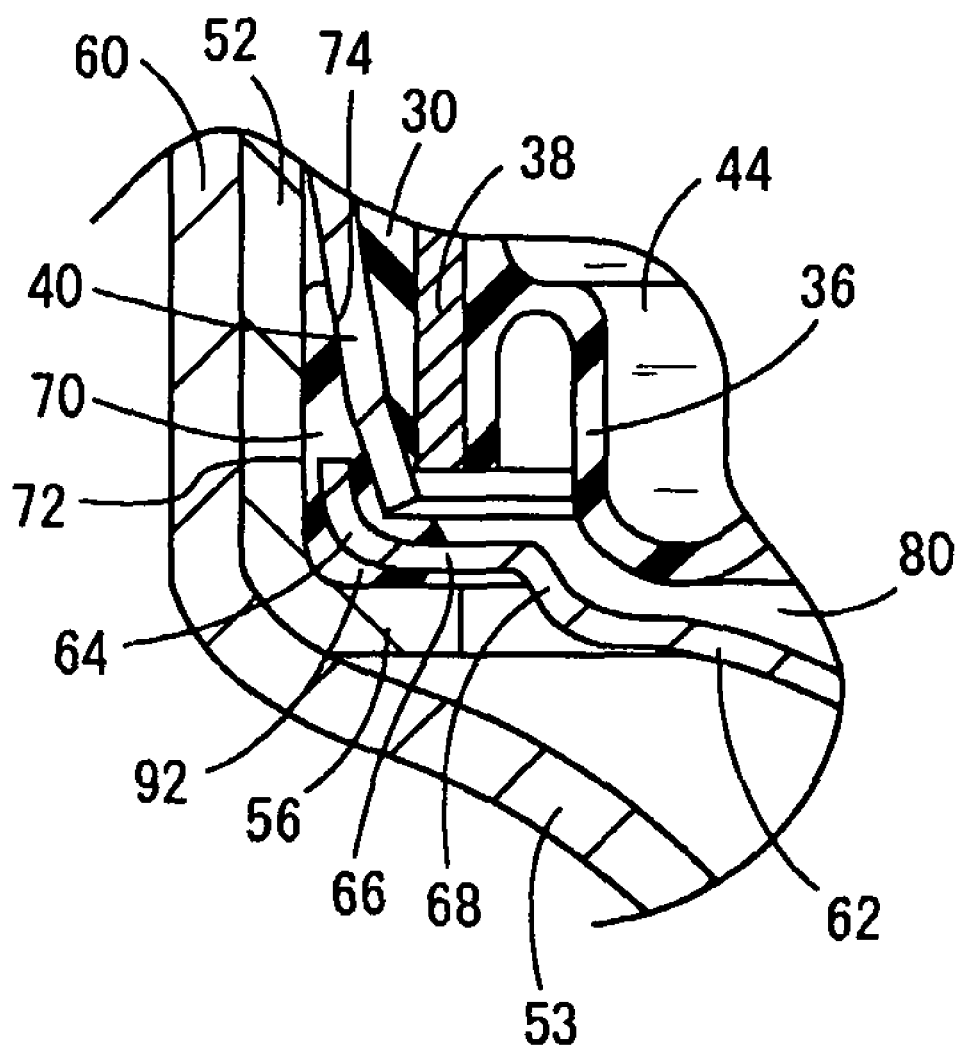
FIG. 10 is a fragmental enlarged view of FIG. 9.

More specifically, a second sealing rubber 92 is bonded by vulcanization onto a bottom face defined by the supported portion 64 and the annular flat portion 66, on the opposite side from the sealing rubber 70. As shown enlargedly in FIG. 10, the second sealing rubber 92 is of a generally flat-plate shape extending from the supported portion 64 to the annular flat portion 66 with a substantially constant wall thickness. With the outer peripheral portion of the bottom wall member 62 is forcedly fixedly clamped by and between the lower end caulking portion 40 of the second mounting member 16 and the annular holding portion 56 of the bracket body 52, the second sealing rubber 92 is disposed in axially compressed state between the outer peripheral portion of the bottom wall member 62 including the supported portion 64 and the annular flat portion 66 and the annular holding portion 56 over the entire circumference.

Further, an outer peripheral portion of the sealing rubber 70 extends to the second sealing rubber 92 across the outer rim of the bottom wall member 62, so that the sealing rubber 70 and the second sealing rubber 92 are integrally formed. Thus, the sealing rubber 70 and the second sealing rubber 92 are provided as an integrally vulcanization molded product 93 equipped with the bottom wall member 62. An outer circumferential surface of the second sealing rubber 92 joins smoothly to the outer circumferential surface 72 of the sealing rubber 70. Thus, an outside diameter of the integrally vulcanization molded product 93 is the same as the outside diameter of the sealing rubber 70 (or the second sealing rubber 92). Further, an inside peripheral edge of the second sealing rubber 92 is located at a generally central portion of the annular flat portion 66 of the bottom wall member 62 in the widthwise direction (i.e. lateral direction in FIGS. 9 and 10). For the sake of simply understanding of the present invention, the surface of the second sealing rubber 92 is depicted as a flat in the drawings. However, since the second sealing rubber 92 is made of rubber elastic material, it actually includes a tiny projections or recesses on the surface.

In the present embodiment, the supported portion 64 of the bottom wall member 62 has an upper end portion extending axially upwardly, so that the outer most peripheral portion of the bottom wall member 62 is of a circular ring shape. Further, like in the first embodiment, both of the upper surface of the annular holding portion 56 of the bracket body 52 and the bottom face of the annular flat portion 66 of the bottom wall member 62 are made flat and extend in the axis-perpendicular direction (lateral direction in FIGS. 9 and 10) over their entire circumferences with a given width. In the present embodiment, particularly, the width dimension of the annular holding portion 56 is greater than that in the first embodiment, while the annular flat portion 66 is larger than that in the first embodiment.

Figure 11:
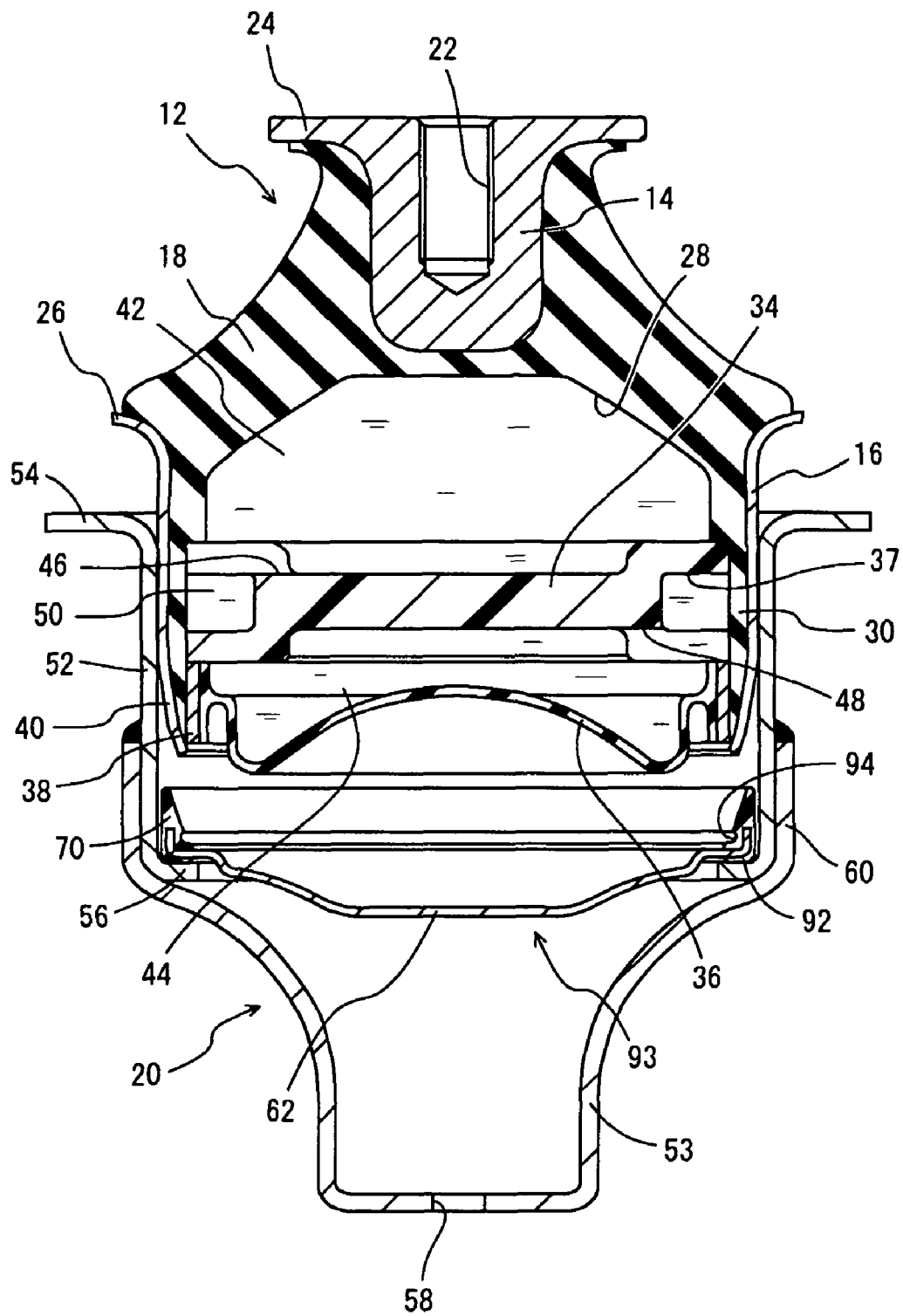
FIG. 11 is an enlarged cross sectional view for explaining one manufacturing step of the automotive engine mount of FIG. 9.
Figure 12:
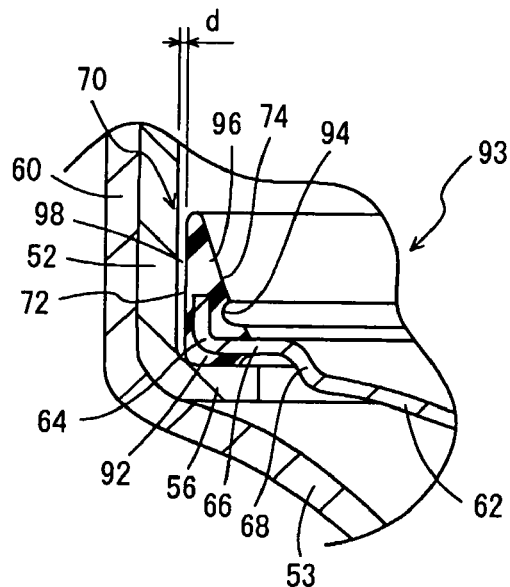
FIG. 12 is a fragmentally enlarged view of FIG. 11.

As will be apparent from FIGS. 11 and 12, the sealing rubber 70 includes an integrally formed annular protrusion 96 protruding radially inwardly so that an inner circumferential surface 74 of the sealing rubber 70 entirely protrudes radially inwardly by a given amount, in comparison with the sealing rubber 70 in the first embodiment as shown in FIG. 6. This arrangement makes it possible to obtain a sufficient rubber volume of the sealing rubber 70 effectively, thereby enhancing fluid-tight sealing ability of the sealing rubber 70. In addition, the presence of the annular protrusion 96 makes it possible to concentrically apply an abutting or pressing force of the sealing rubber 70 against lower end caulking portion 40 of the second mounting member 16, thereby assuring further enhanced sealing capability of the sealing rubber 70 with stability. Further, there is formed an annular recess 94 open in its inner circumferential surface 74 facing radially inwardly. This annular recess 94 is positioned on the basal side of the sealing rubber 70, so as to be located radially inside of the outer most peripheral edge of the bottom wall member 62 with a given radial distance. The annular recess 94 extends over an entire circumference with a constant cross sectional shape of generally arc shape opening radially inwardly.

In the state before the integrally vulcanization molded product 93 composed of the bottom wall member 62, the sealing rubber 70 and the second sealing rubber 92 is assembled with the automotive engine mount 90, as shown in FIGS. 11 and 12, the outer circumferential surface 72 of the sealing rubber 70 has an outside diameter that is smaller by a given amount than the inside diameter of the bracket body 52.

With the integrally vulcanization molded product 93 positioned coaxially with the bracket 20, and with the second sealing rubber 92 of the integrally vulcanization molded product 93 superposed on the annular holding portion 56 of the bracket body 52 in the axial direction, the outer circumferential surface 72 of the sealing rubber 70 and the inner circumferential surface of the bracket body 52 faces to each other with a gap 98 of a given width distance "d" in the axis-perpendicular or radial direction interposed therebetween (in the lateral direction in FIGS. 11 and 12). In the present embodiment, both of the outer circumferential surface 72 of the sealing rubber 70 and the inner circumferential surface of the bracket body 52 are of a round tubular shape, so that the width dimension "d" of the gap 98 is generally constant over its entire circumference. Since the outside diameter of the integrally vulcanization molded product 93 is made substantially equal to an outside diameter of the annular holding portion 56 of the bracket body 52, it is relatively easy to center the integrally vulcanization molded product 93 and the bracket 20.

For manufacturing the automotive engine mount 90 of this construction, like in the first embodiment for example, the mount body 12, the bracket 20, the integrally vulcanization molded product 93 having the bottom wall member 62, the sealing rubber 70 and the second sealing rubber 92 have been prepared in advance.

Subsequently, the second sealing rubber 92 bonded to the bottom surface of the outer peripheral portion of the bottom wall member 62 in the integrally vulcanization molded product 93 is superposed on the annular holding portion 56 of the bracket body 52, while the central portion and the annular step portion 68 of the bottom wall member 62 is fitted into the inside of the annular holding portion 56. With this state, the central portion of the bottom wall member 62 projects out axially outwardly (downward in FIG. 9) from the one open end of the bracket body 52 at which the annular holding portion 56 is provided (the lower end in FIG. 9), thereby positioning the integrally vulcanization molded product 93 against the bracket 20. As mentioned above, with the second sealing rubber 92 superposed on the annular holding portion 56, the gap 98 is formed between the outer circumferential surface 72 of the sealing rubber 70 and the inner circumferential surface of the bracket body 52 over the entire circumference.

Next, the mount body 12 is press fitted into the bracket body 52 from the other open end (axially upper end in FIG. 9) of the bracket body 52 in the axial direction.

During this press fitting operation, since the gap 98 is formed between the outer circumferential surface 72 of the sealing rubber 70 and the inner circumferential surface of the bracket body 52, excess air remained in the space defined between the second mounting member 16 and the bracket body 52 can be released through the gap 98. With this respect, the presence of the annular recess 94 open in the inner circumferential surface 74 of the sealing rubber 70 at its basal end portion may induce radially inward sloping of the upper end portion of the sealing rubber 70 due to the air pressure of the excess air during the press fitting operation. Namely, the cross sectional area of the sealing rubber 70 is locally reduced at the portion where the annular recess 94 is formed. With this arrangement, when the air pressure is applied to the sealing rubber 70, the upper end portion of the sealing rubber 70 is likely to undergo radially inward deformation based on the annular recess 94, thereby effectively providing an opening of the gap 98. Thus, the air is likely to be led into the gap 98 through an enlarged opening due to the radially inward deformation of the upper end portion of the sealing rubber 70.

Further, for holding in position the integrally vulcanization molded product 93 against the bracket 20, the second sealing rubber 92 is only superposed on the annular holding portion 56 of the bracket body 52, tiny gaps are formed between superposing surfaces of the second sealing rubber 92 and the annular holding portion 56 of metal.

Accordingly, an excess air contained in the gap 98 may be discharged to the outside through the gap formed between the second sealing rubber 92 and the annular holding portion 56, and through an opening of the bracket body 52 on the side of the annular holding portion 56, and the bolt through hole 58 formed through the fixation leg 53.

By superposing the flange portion 26 of the second mounting member 16 against the flange portion 54 of the bracket body 52, the inclined inner circumferential surface 74 of the sealing rubber 70 and the inclined outer circumferential surface of the lower end caulking portion 40 of the second mounting member 16 are brought into close contact with each other in the axial direction. In addition, the distal end portion (face) of the lower end caulking portion 40 is forcedly pressed against the basal end portion of the sealing rubber 70 in which the annular recess 94 is formed, whereby the sealing rubber 70 undergoes compression deformation in the axial direction between the lower end caulking portion 40 and the supported portion 64 as well as the annular flat portion 66.

According to the axial compression deformation of the sealing rubber 70, the sealing rubber 70 also undergoes diameter expansion deformation in the axis-perpendicular direction, whereby the tubular outer circumferential surface 72 of the sealing rubber 70 is held in close contact with the inner circumferential surface of the bracket body 52. In the present embodiment, since the annular protrusion 96 is integrally formed at the distal end portion and the radially inner side of the sealing rubber 70, and the inner circumferential surface 74 of the sealing rubber 70 largely protrudes radially inwardly. This assures a sufficient volume of the sealing rubber 70, ensuring enhanced sealing between the inner circumferential surface 74 of the sealing rubber 70 and the outer circumferential surface of the lower end caulking portion 40. Owing to the provision of the annular recess 94 on the basal end portion side of the sealing rubber 70, load concentration against the basal end portion of the sealing rubber 70 may be prevented during the diameter expansion deformation of the sealing rubber 70, thereby assuring sufficient durability of the sealing rubber 70, and the intended elasticity with stability.

In addition, as the second mounting member 16 is forcedly press fitted into the bracket 20, the annular flat portion 66 of the bottom wall member 62 moves in the axial direction towards the annular holding portion 56 of the bracket body 52. As a result, the second sealing rubber 92 is axially compressed and disposed between the annular flat portion 66 and the annular holding portion 56, thereby eliminating fine gaps formed between superposing surfaces of the second sealing rubber 92 and the annular holding portion 56.

With the mount body 12 press fitted into the bracket 20, the outer peripheral portion of the bottom wall member 62 is forcedly fixedly clamped by and between the second mounting member 16 and the annular holding portion 56 of the bracket 20, and the gap formed between the second mounting member 16, the bracket 20 and the bottom wall member 62 are fluid-tightly closed by the sealing rubber 70 and the second sealing rubber 92. Thus, there is formed the tightly closed air chamber 80 covered by the bottom wall member 62 on the side opposite from the equilibrium chamber 44 with the diaphragm 36 interposed therebetween.

In the automotive engine mount 90 of construction according to the present embodiment, before the mount body 12 is press fitted into the bracket 20, the gap 98 is formed between the outer circumferential surface of the integrally vulcanization molded product 93 having the sealing rubber 70 and the bottom wall member 62 and the inner circumferential surface of the bracket body 52. Therefore, excess air generated during press fitting of the mount body 12 against the bracket 20 can be discharged through the gap 98.

In this embodiment, therefore, it is not necessary to form the air vent hole 86 in the bracket body 52, eliminating a risk of deterioration in strength of the bracket body 52 due to the formation of the air vent hole 86 perforated therethrough, in addition to facilitating the manufacturing processes.

In the present embodiment, the second sealing rubber 92 is provided on the bottom face of the outer peripheral portion of the bottom wall member 62, and this second sealing rubber 92 is disposed between and compressed by the outer peripheral portion of the bottom wall member 62 and the annular holding portion 56 of the bracket body 52 in the axial direction. This arrangement makes it possible to further enhance fluid-tight sealing in the tightly closed air chamber 80 by press fitting, while permitting air leakage through the gap between superposed surfaces of the second sealing rubber 92 and the annular holding portion 56 upon press fitting of the mount body 12 against the bracket 20. In addition, the second sealing rubber 92 is integrally formed with the sealing rubber 70. Therefore, even if the outside diameter of the sealing rubber 70 is smaller than the inside diameter of the bracket body 52, a volume of rubber to be compressed between the second mounting member 16, the bracket 20 as well as the bottom wall member 62 can be sufficiently obtained, thus assuring intended fluid-tight sealing of the tightly closed air chamber 80 with stability.

While the present invention has been described in detail in its presently preferred embodiments, for illustrative purpose only, it is to be understood that the invention is by no means limited to the details of the illustrated embodiment, but may be otherwise embodied.

For instance, the holder member is not limited to the bracket 20 of construction illustrated in the aforementioned embodiments, but may otherwise be embodied. A variety of structure may be employed in a non-compressible fluid sealing area. More specifically described, one or two or more orifice passages which are different in length and cross sectional area may be provided with various structure in the partition member 34 partitioning the pressure-receiving chamber 42 and the equilibrium chamber 44 from each other. In addition to these orifice passages, a known movable plate or film may be employed to absorb tiny pressure differences between the pressure-receiving chamber and the equilibrium chamber.

While in the illustrated embodiments the tightly closed air chamber 80 is employed, the bottom wall member 62 may be formed with a perforated port for making it connectable to the outside conduit. By so doing, it is possible to adjust or control the air pressure in the air chamber through the external operation.

Figure 13:
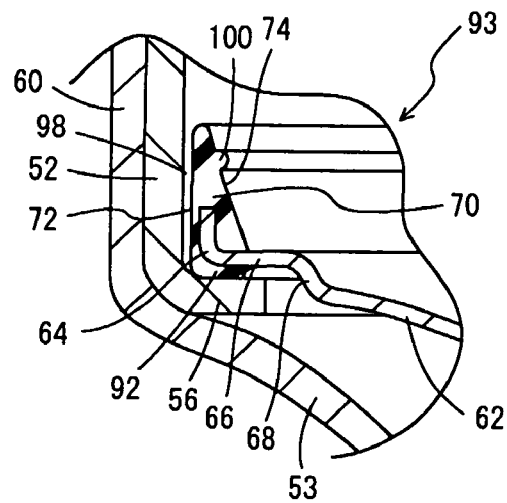
FIG. 13 is an enlarged cross sectional view for explaining one manufacturing step of an automotive engine mount of construction according to another embodiment of the present invention.

In the third embodiment, the annular recess 94 is formed open in the inner circumferential surface 74 of the sealing rubber 70 at the basal end side, and the annular protrusion 96 is formed so as to be located above the annular recess 94 for being superposed against the lower end caulking portion 40 of the second mounting member 16. Namely, the annular protrusion 96 is formed by entirely protruding the inner circumferential surface 74 of the sealing rubber 70 radially inwardly. Alternatively, an annular seat may be formed on the inner circumferential surface 74 of the sealing rubber 70 so as to project out. One example of the annular seat is shown in FIG. 13, wherein an annular protrusion 100 is formed on the inner circumferential surface 74 of the sealing rubber 70 at the distal end side so as to project out and extend circumferentially over an entire circumference with a generally constant semi-circular cross sectional shape. With this arrangement, when the sealing rubber 70 is compressed between the lower end caulking portion 40 and the bottom wall member 62 as well as the bracket body 52, the annular protrusion 100 undergoes compression deformation between the lower end caulking portion 40 and the bottom wall member 62 as well as the bracket body 52, thereby enhancing further a fluid-tight sealing in the tightly closed air chamber 80.

It is also to be understood that the present invention may be embodied with various changes, modifications and improvements which may occur to those skilled in the art, without departing from the spirit and scope of the invention.

What is claimed is:

1. A fluid filled vibration damping device comprising:
   a first mounting member;
   a second mounting member of tubular shape, disposed such that the first mounting member is located on a side of a first open end portion of the second mounting member;
   a main rubber elastic body elastically connecting the first mounting member and the second mounting member, and fluid-tightly sealing off the first open end portion of the second mounting member;
   a flexible rubber film fluid-tightly sealing off a second open end portion of the second mounting member;
   a partition member disposed between opposing faces of the main rubber elastic body and the flexible rubber film, and supported by the second mounting member;
   a pressure-receiving chamber formed on one side of the partition member with a non-compressible fluid sealed therein, the pressure-receiving chamber being partially defined by the main rubber elastic body and subjected to an input of vibration;
   an equilibrium chamber formed on an other side of the partition member with the non-compressible fluid sealed therein, the equilibrium chamber being partially defined by the flexible rubber film and allowed to have a variable volume;
   an orifice passage connecting the pressure-receiving chamber and the equilibrium chamber, and being formed by utilizing the partition member;
   a holder member of tubular shape into which the second mounting member is press fitted so that the second mounting member adapted to be mounted via the holder member on a target member whose vibration is requested to be damped, the holder member including an annular holding portion integrally formed at one open end thereof so as to project radially inwardly;
   a cover plate member having an outside diameter smaller than an inside diameter of the holder member, and disposed within the holder member with an outer peripheral portion thereof supported by the annular holding portion of the holder member, and fixedly clamped by and between the second open end portion of the second mounting member and the annular holding portion,
   wherein the second open end portion of the second mounting member has a tapered outer circumferential surface with a diameter gradually decreasing toward a tip end, and
   wherein a sealing rubber is disposed for fluid-tightly closing a gap formed between the second open end portion of the second mounting member, and the cover plate member as well as the holder member so that a tightly closed air chamber partially defined by the cover plate member is formed on a side opposite from the equilibrium chamber with the flexible rubber film interposed therebetween.

2. A fluid filled vibration damping device according to claim 1, wherein the sealing rubber is bonded by vulcanization to the outer peripheral portion of the cover plate member so as to project axially toward an inside of the holder member.

3. A fluid filled vibration damping device according to claim 2, wherein the sealing rubber has a tubular outer circumferential surface extending axially from the outer peripheral portion of the cover plate member, and a tapered inner circumferential surface with a diameter gradually decreasing from a tip end thereof to a basal end thereof, and wherein the sealing rubber is disposed while being compressed in an axial direction and an axis-perpendicular direction in the gap formed between the second open end portion of the second mounting member and the cover plate member as well as the holder member.

4. A fluid filled vibration damping device according to claim 1, wherein the first open end portion of the second mounting member is bonded by vulcanization onto an outer circumferential surface of the main rubber elastic body, and an annular rubber-film fixation member is bonded by vulcanization to an outer rim of the flexible rubber film, while the second open end portion of the second mounting member is disposed onto the rubber-film fixation member and is subjected to a diameter decreasing operation so that the rubber-film fixation member is fixed to the second mounting member.

5. A fluid filled vibration damping device according to claim 1, wherein the holder member includes an air vent hole perforated through a wall thereof at position located forward in a direction of press fitting of the second mounting member.

6. A fluid filled vibration damping device according to claim 1, wherein the sealing rubber is bonded by vulcanization to the outer peripheral portion of the cover plate member so as to project axially toward an inside of the holder member, and the sealing rubber has an outside diameter in an initial state before being assembled, which is smaller than the inside diameter of the holder member, and wherein once the second mounting member has been press fitted into the holder member, the sealing rubber undergoes diameter expansion deformation by means of the second open end portion of the second mounting member pressed into the holder member so that the sealing rubber is held in close contact with an inner circumferential surface of the holder member to provide a fluid-tight closure to the gap formed between the second open end portion of the second mounting member, and the cover plate member as well as the holder member.

7. A fluid filled vibration damping device according to claim 1, further comprising a second sealing rubber formed on a bottom surface of the outer peripheral portion of the cover plate member, wherein the second sealing rubber is disposed and compressed axially between the outer peripheral portion of the cover plate member and the annular holding portion of the holder member over an entire circumference.

8. A fluid filled vibration damping device according to claim 7, wherein the bottom surface of the outer peripheral portion of the cover plate member and a surface of the annular holding portion of the holder member compressing the second sealing rubber are made flat extending in an axis-perpendicular direction with a given width over the entire circumference.

9. A fluid filled vibration damping device according to claim 1, wherein an inner circumferential surface of the sealing rubber that comes into contact with the second open end portion of the second mounting member includes an annular protrusion extending over an entire circumference.

10. A fluid filled vibration damping device according to claim 1, wherein a central portion of the cover plate member projects out in an axially outward direction from an axial end portion of the holder member.

11. A method of manufacturing a fluid filled vibration damping device including: a first mounting member; a second mounting member of tubular shape, disposed such that the first mounting member is located on a side of a first open end portion of the second mounting member; a main rubber elastic body elastically connecting the first mounting member and the second mounting member, and fluid-tightly sealing off the first open end portion of the second mounting member; a flexible rubber film fluid-tightly sealing off a second open end portion of the second mounting member; a partition member disposed between opposing faces of the main rubber elastic body and the flexible rubber film, and supported by the second mounting member; a pressure-receiving chamber formed on one side of the partition member with a non-compressible fluid sealed therein, the pressure-receiving chamber being partially defined by the main rubber elastic body and subjected to an input of vibration; an equilibrium chamber formed on an other side of the partition member with the non-compressible fluid sealed therein, the equilibrium chamber being partially defined by the flexible rubber film and allowed to have a variable volume; an orifice passage connecting the pressure-receiving chamber and the equilibrium chamber; and being formed by utilizing the partition member; a holder member of tubular shape into which the second mounting member is press fitted so that the second mounting member adapted to be mounted via the holder member on a target member whose vibration is requested to be damped, the holder member including an annular holding portion integrally formed at one open end thereof so as to project radially inwardly; a cover plate member having an outside diameter smaller than an inside diameter of the holder member, and disposed within the holder member with an outer peripheral portion thereof supported by the annular holding portion of the holder member, and fixedly clamped by and between the second open end portion of the second mounting member and the annular holding portion, wherein the second open end portion of the second mounting member has a tapered outer circumferential surface with a diameter gradually decreasing toward a tip end, and wherein a sealing rubber is disposed for fluid-tightly closing a gap formed between the second open end portion of the second mounting member, and the cover plate member as well as the holder member so that a tightly closed air chamber partially defined by the cover plate member is formed on a side opposite from the equilibrium chamber with the flexible rubber film interposed therebetween, the method comprising the steps of:

preparing a fluid filled vibration damping device body in which the first and second mounting members are connected by the main rubber elastic body with the pressure-receiving chamber and the equilibrium chamber formed therein, separately from the holder member and the cover plate member;

setting the cover plate member with respect to the holder member with the outer peripheral portion of the cover plate member superposed on and supported by the annular holding portion of the holder member in position;

press-fitting the second mounting member of the fluid filled vibration damping device body into the holder member so that the outer peripheral portion of the cover plate member is fixedly clamped by and between the second mounting member and the annular holding portion of the holder member, while the gap formed between the second mounting member and the holder member as well as the cover plate member is fluid tightly closed by the sealing rubber.

12. A method of manufacturing a fluid filled vibration damping device according to claim 11, further comprising the steps of:

preparing an integrally vulcanization molded product wherein the sealing rubber is bonded by vulcanization on the outer peripheral portion of the cover plate member so as to project axially from the cover plate member with a cylindrical outer circumferential surface;

setting the integrally vulcanization molded product with respect to the holder member with a bottom surface of the outer peripheral portion of the cover plate member, which is opposite from a side on which the sealing rubber projects, superposed on and positioned to the annular holding portion of the holder member;

press-fitting the second mounting member of the fluid filled vibration damping device body into the holder member so that an air in a space between the second mounting member and the holder member is discharged from the one open end of the holder member to an outside through a gap formed between an outer circumferential surface of the integrally vulcanization molded product and an inner circumferential surface of the holder member; and then subjecting the sealing rubber to diameter expansion deformation by the second open end portion of the second mounting member press fitted into the holder member so that the sealing rubber is held in close contact with the inner circumferential surface of the holder member to fluid-tightly close the gap formed between the second open end portion of the second mounting member and the cover plate member as well as the holder member.

* * * * *